United States Patent [19]
Latino et al.

[11] Patent Number: 5,881,500
[45] Date of Patent: Mar. 16, 1999

[54] DISTRIBUTION DUCT FOR WORK SPACE ENVIRONMENT SYSTEM

[75] Inventors: Richard M. Latino, Sterling; Patrick K. Beck, Princeton; Edmund T. Paquette, Shrewsbury, all of Mass.

[73] Assignee: Applied Power Inc., Butler, Wis.

[21] Appl. No.: 784,879

[22] Filed: Jan. 16, 1997

Related U.S. Application Data

[60] Provisional application No. 60/025,874, Sep. 13, 1996.
[51] Int. Cl.[6] .............................. E04C 1/39; H02G 3/04
[52] U.S. Cl. .......................... 52/36.1; 52/36.6; 52/220.7; 52/239
[58] Field of Search .................................. 52/36.1, 36.6, 52/220.7, 239

[56] References Cited

U.S. PATENT DOCUMENTS

| 4,688,869 | 8/1987 | Kelly . | |
|---|---|---|---|
| 4,874,322 | 10/1989 | Dola et al. | 52/239 X |
| 4,876,835 | 10/1989 | Kelley et al. . | |
| 5,287,666 | 2/1994 | Frascaroli et al. | 52/239 |
| 5,511,349 | 4/1996 | Kelley et al. | 52/220.7 X |
| 5,638,650 | 6/1997 | Edwards | 52/239 |

OTHER PUBLICATIONS

PP. 17–24 from a Catalog of Symbiote, Inc., Copyright 1994.
Cover and pp. 10 and 11 from a Catalog of Nello Wall Systems, dated Jan. 1, 1993.

Primary Examiner—Christopher Kent
Attorney, Agent, or Firm—Quarles & Brady

[57] ABSTRACT

A distribution duct for power distribution wiring, data communication wiring, and the other wiring is mounted between adjacent perforated support columns of a work space system. The duct extends laterally from the columns to allow the wiring to pass the face of a column. The duct includes an inner elongated member which rests at each end in a perforation in a respective column. A resilient clip holds each end of the inner member in the perforations. The inner member has an open side that is covered by an elongated outer member that is coextensive with the inner member and extends laterally away from one side of the columns. The outer member is snapped in place on the inner member, and covers snap in place on the outer members to connect the ends of adjacent outer members. An identical inner member may be mounted to the rear of a first inner member and receive a similar outer member to form a two-sided duct.

26 Claims, 11 Drawing Sheets

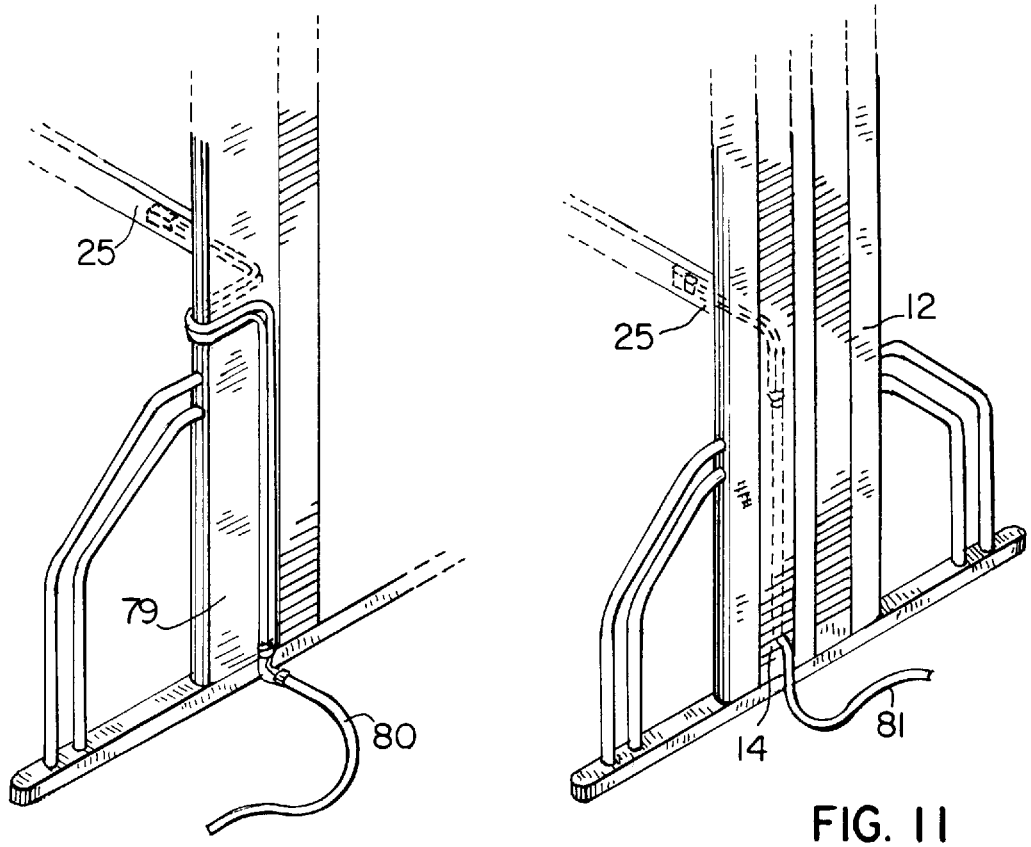
FIG. 10
FIG. 11
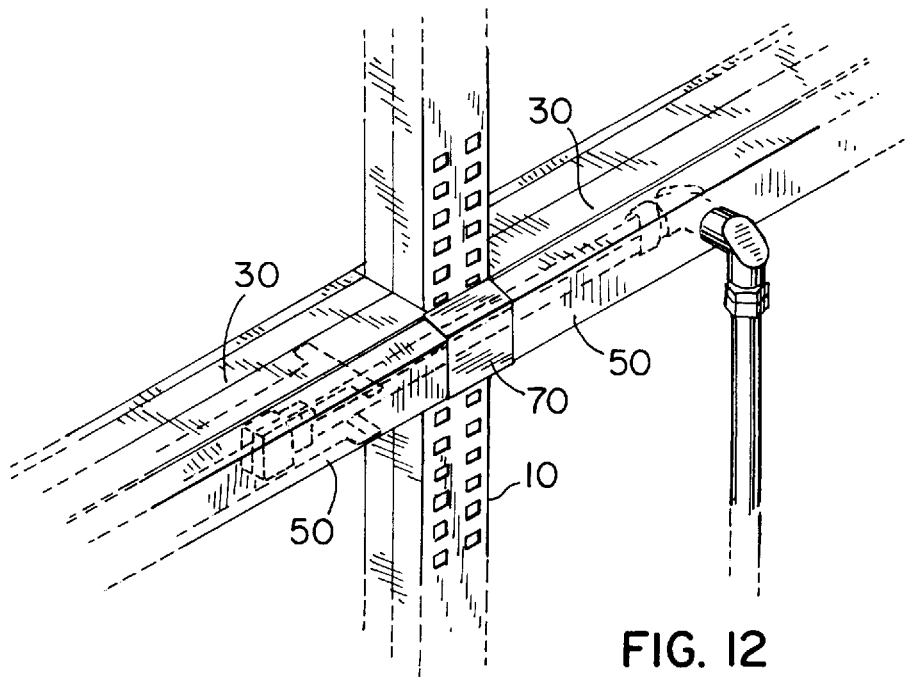
FIG. 12

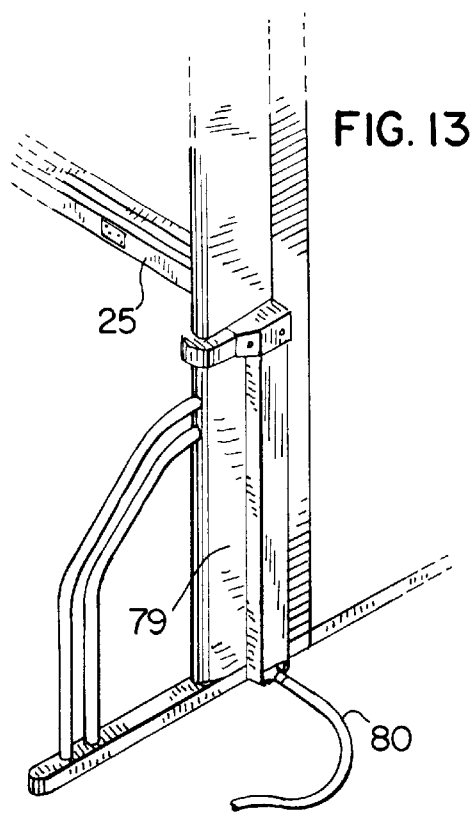
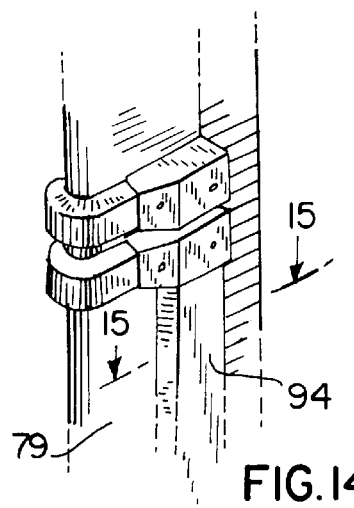
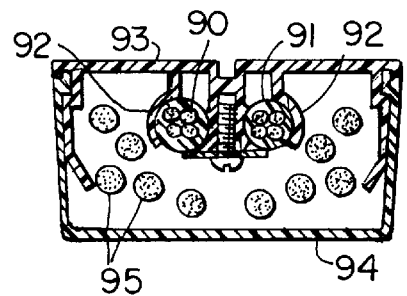
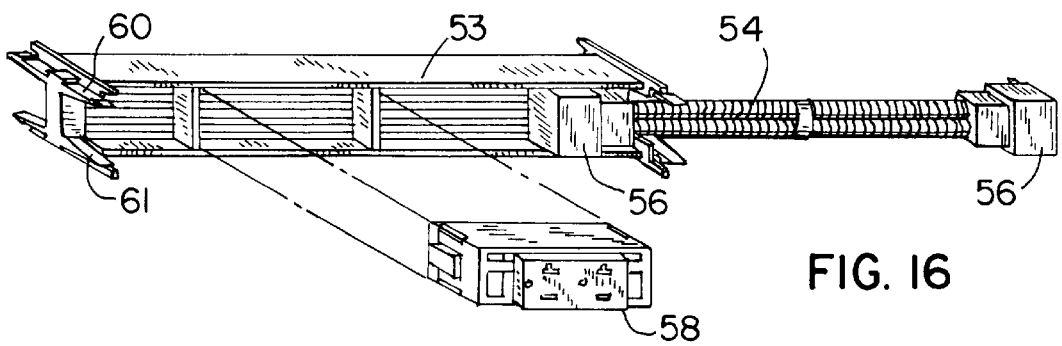
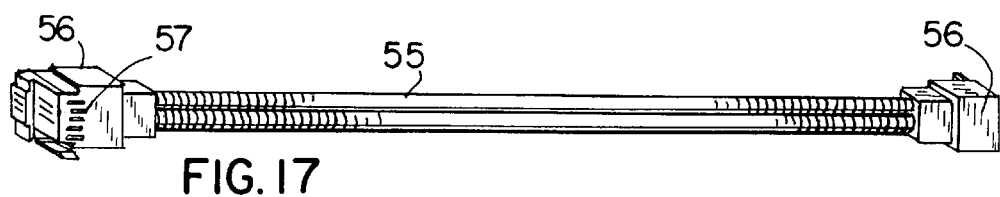

DISTRIBUTION DUCT FOR WORK SPACE ENVIRONMENT SYSTEM

This application claims the benefit of U.S. Provisional Application No. 60/025,874 filed Sep. 13, 1996.

BACKGROUND OF THE INVENTION

This invention relates to work space environmental systems and particularly to a distribution duct that can be mounted at selective levels on such a system and which can carry wiring for power distribution or data transmission, or piping for fluid supplies.

A common form of work environment system employs a series of spaced columns to which are attached panels, legs, table surfaces, cabinets, shelves, and the like, to form a customized work station. One form of such systems uses columns that are perforated to define a series of openings that receive hooks for supporting the work surfaces, shelves, and cabinets.

Such work environment systems typically require electrical outlets and connections for telephone and other data transmission lines. Generally, the power lines and data lines have been housed in a baseboard that extends between the bottoms of adjacent columns. If the wiring must extend into the space between another set of columns, it will typically pass through openings formed in the columns. When distribution ducts are provided at levels above the baseboard, they are either mounted on the face of a panel or wholly within a panel, such as shown in U.S. Pat. No. 4,876,835 issued Oct. 31, 1989 to James O'Kelley, et al. for "Work Space Management System".

It is a principal object of the invention to provide distribution ducts that are contained between adjacent columns and extend laterally from the columns to allow wiring or piping to pass the face of a column into the space beyond the column.

It is a further object of the invention to provide distribution ducts which are accessible from both the front and rear sides of the columns.

It is also an object of the invention to provide distribution ducts which can be mounted at a variety of selectable positions along the length of the columns.

SUMMARY OF THE INVENTION

In accordance with the invention, a distribution duct comprises an elongated inner member adapted to extend transversely between adjacent columns of a work space system. The inner member has a first open side which can be covered by an elongated outer member. The outer member extends laterally from the plane of the side of the column. Preferably, the inner member has a second open side which may be covered by another outer member that extends laterally from the plane of the opposite side of the column.

Further in accordance with the invention, a series of ducts are mounted on a series of adjacent columns, and covers connect the ends of adjacent outer members to span the face of the column.

The ducts are adapted to mount power distribution wiring and electrical outlets, data communication wiring and outlets, and piping and hosing for gas, compressed air, or water.

Also in accordance with the invention, the distribution duct is provided for attachment to perforated support columns. The distribution duct includes an inner elongated member that extends transversely between adjacent columns and rests at each end in a perforation in the column. The inner member has a first open side that is covered by an elongated outer member that is coextensive with the inner member and which extends laterally away from one side of the columns. Preferably, a resilient clip holds each end of the inner member in the perforations of a column. The outer member is snapped in place on the inner member, and covers snap in place on the outer members to connect the ends of the adjacent outer members.

The invention further resides in a kit of parts for a distribution duct.

The foregoing and other objects and advantages of the invention will appear in the detailed description that follows. In the description, reference is made to the accompanying drawings which illustrate preferred embodiments of the invention.

BRIEF DESCRIPTION OF THE DRAWINGS

FIGS. 10, 11, and 12 illustrate alternate connections for power entry cables to the distribution ducts;

FIG. 13 is a view similar to FIG. 10 but showing covers in place over the power entry cables;

FIG. 14 is an enlarged view similar to FIG. 13 but showing covers for both power and data entry wiring;

FIG. 15 is a view in cross-section taken in the plane of the line 15—15 in FIG. 14;

FIG. 16 is a view in perspective showing the assembly of a conductor track, a track connector cable, and a power outlet;

FIG. 17 is a view in perspective of a pass-through cable for use with the tracks of FIG. 16;

DETAILED DESCRIPTION OF THE PREFERRED EMBODIMENT

Figure 1:
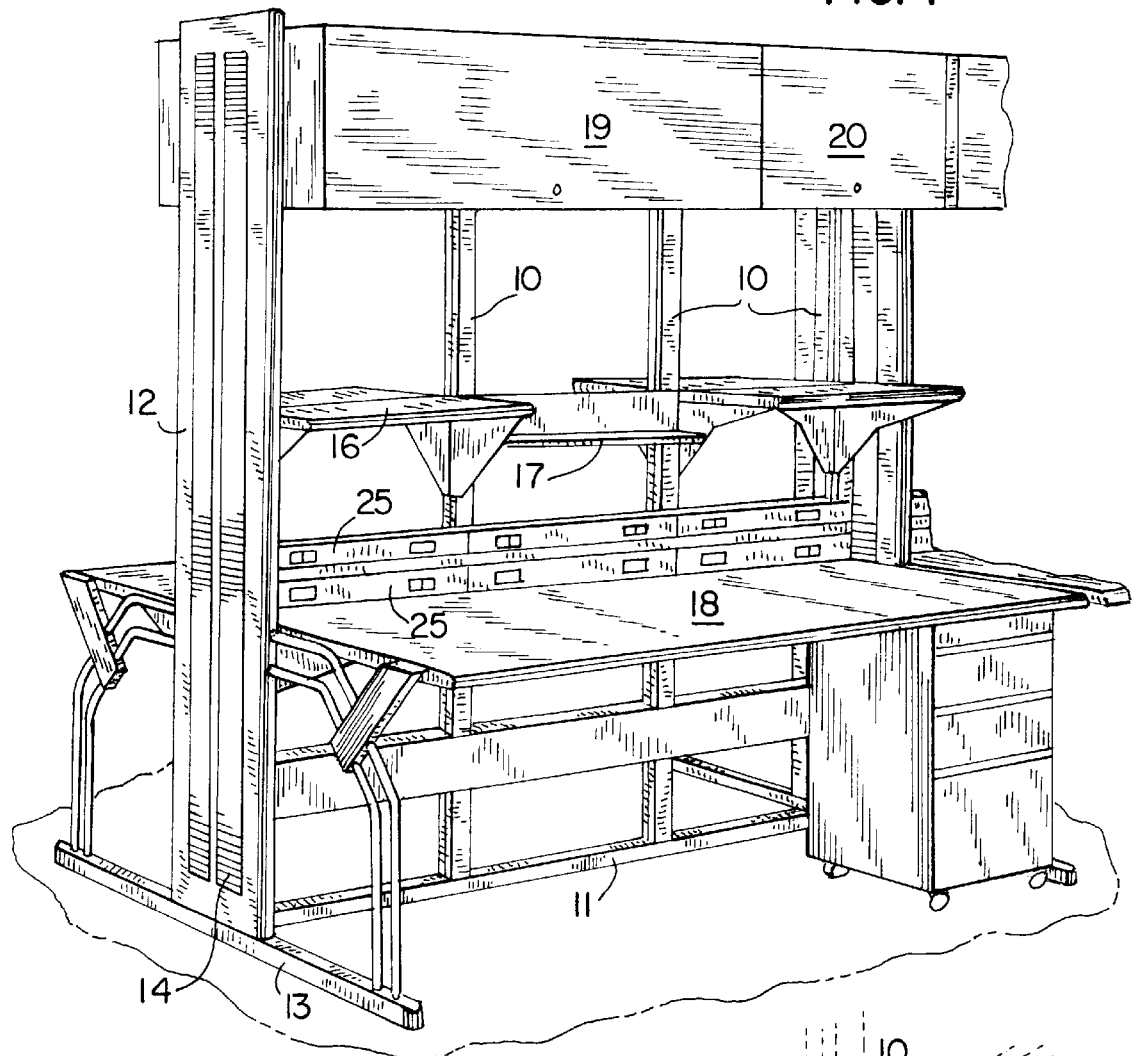
FIG. 1 is a view in perspective of a work station environment system incorporating the distribution ducts of the present invention.
Figure 2:
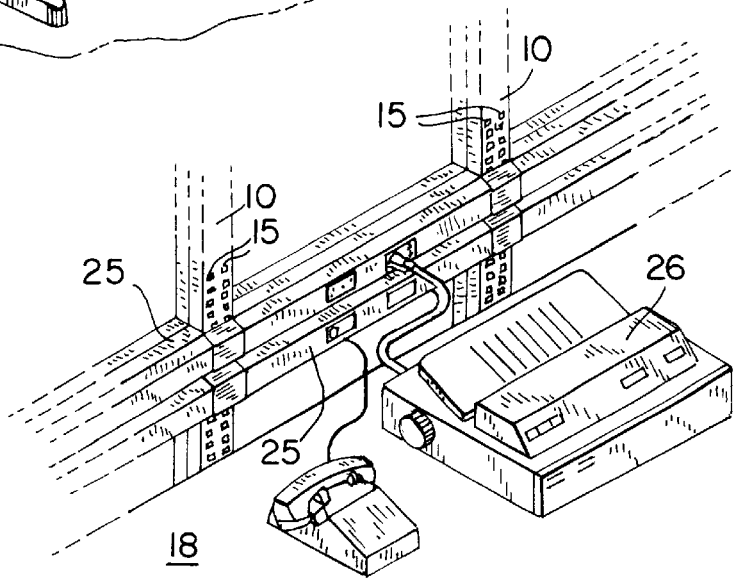
FIG. 2 is a partial view in perspective showing the attachment of a telephone and printer to distribution ducts incorporated into the system of FIG. 1.
Figure 3:
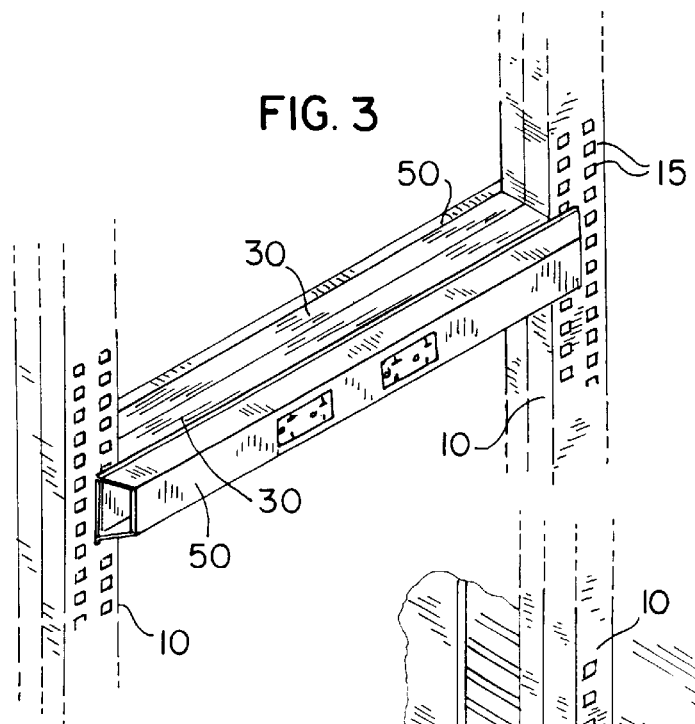
FIG. 3 is a partial view in perspective of a duct spanning a pair of support columns.

Referring to FIGS. 1 and 2, the distribution duct of the present invention is particularly adapted for use with a work station system that includes a frame having spaced columns 10 and upper and lower cross-members 11 joining the top and bottom of the columns 10. Uprights 12 with leg stabilizers 13 are attached to the end columns 10 of the frame. The uprights may include cable management elements 14 of known construction. The columns 10 are provided with a series of uniformly spaced perforations 15. A variety of elements can be mounted on the columns 10 by hooks that engage the perforations 15. The elements can include shelves 16, 17 work surfaces 18, and cabinets 19, 20. The columns 10 are typically two-sided with perforations 15 on both sides. Therefore, elements can be attached to both sides of the columns 10.

As shown in FIG. 2, the distribution ducts indicated generally by the numeral 25 are designed to extend between and in front of or behind columns 10. The distribution ducts 25 can carry power lines to power a printer 26, for example, and data lines to provide telephone connections. The distribution ducts 25 are the same whether the duct carries power lines or data lines, only the contents of the distribution duct differs. Similarly, the distribution ducts 25 can also carry piping or hosing (not shown) for distribution of fluids, such as air, water, or gas.

A basic element of the distribution duct is an elongated inner duct member 30. The inner member 30 has a front face 31 with top and bottom portions 32 and 33, respectively, extending rearwardly from the front face 31 and terminating in flanges 34 and 35,, respectively. The front face 31 has elongated openings 36 with top and bottom lips 37 extending from the top and bottom of the openings 36. The front face 31 has ends 38 that extend longitudinally beyond the top and bottom portions 32 and 33. The ends 38 have perforations 39 and 40 which can be aligned with the perforations 15 in the columns 10. The perforation 39 includes a rearwardly extending tab 41.

Figure 20:
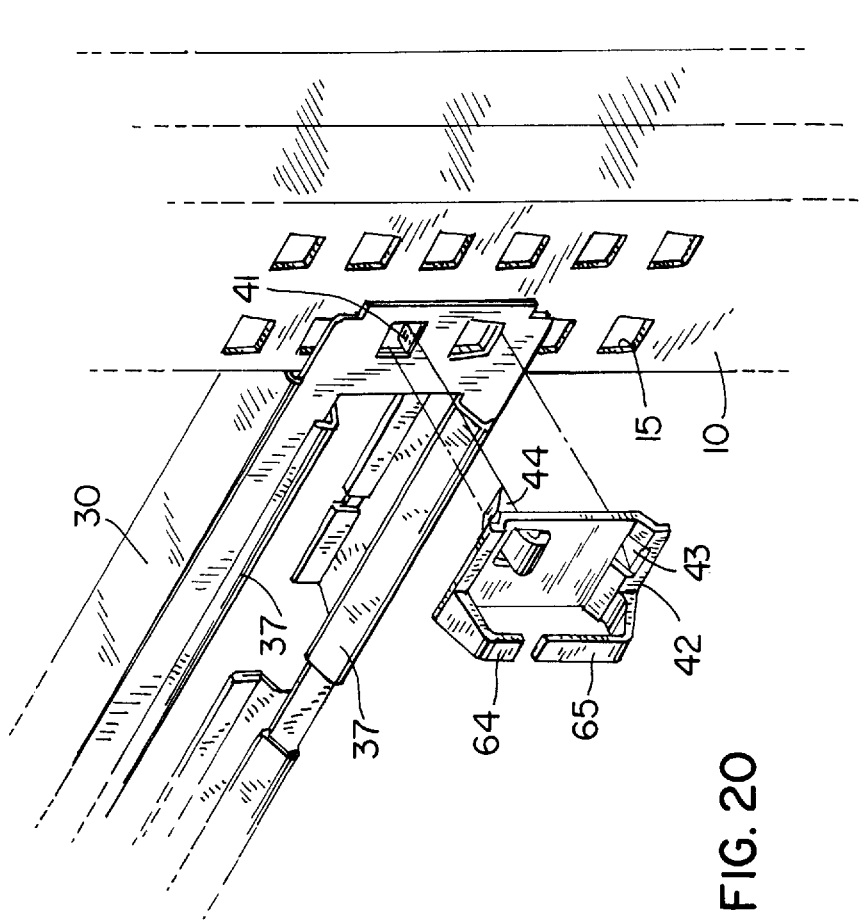
FIG. 20 is a partial exploded view in perspective illustrating the attachment of the resilient retainer clip.
Figure 27:
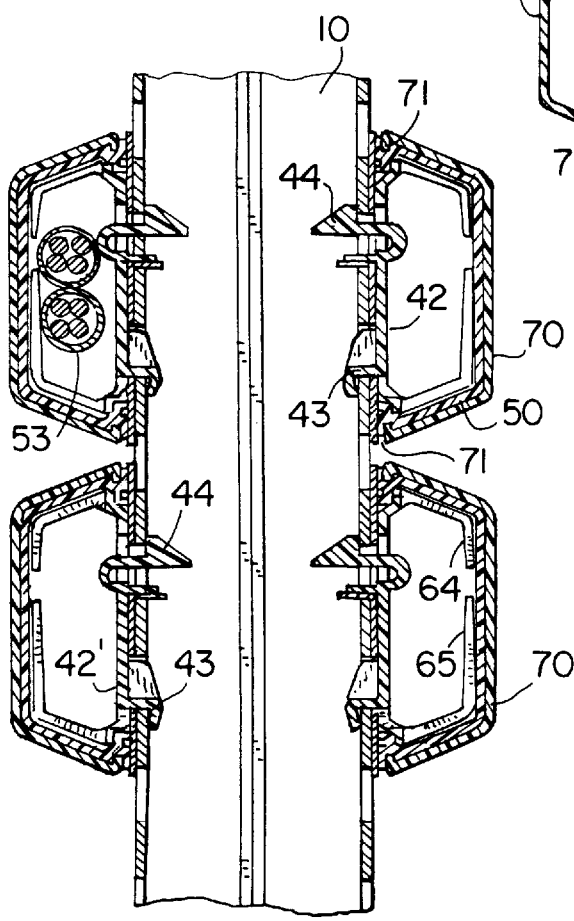
FIG. 27 is a view in vertical section taken in the plane of the line 27—27 of FIG. 24.
Figure 32:
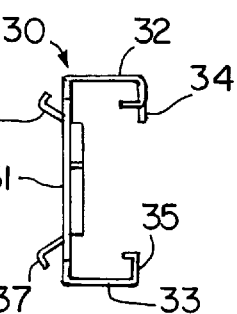
FIG. 32 is a view in cross-section taken in the plane of the line 32—32 in FIG. 30.
Figure 29:
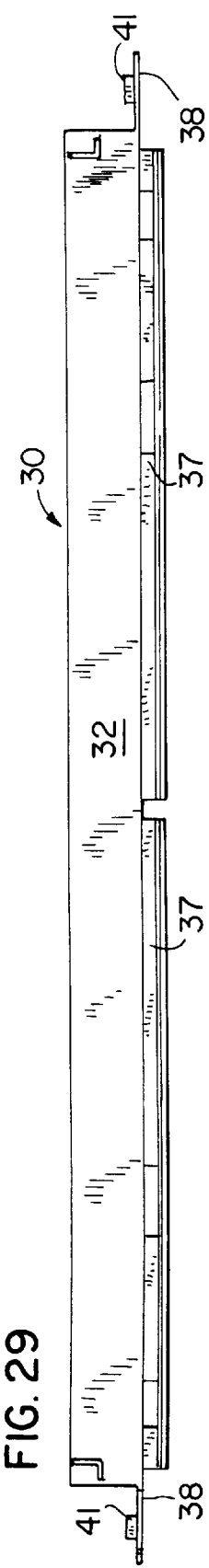
FIG. 29 is a top plan view of an elongated inner duct member.
Figure 30:
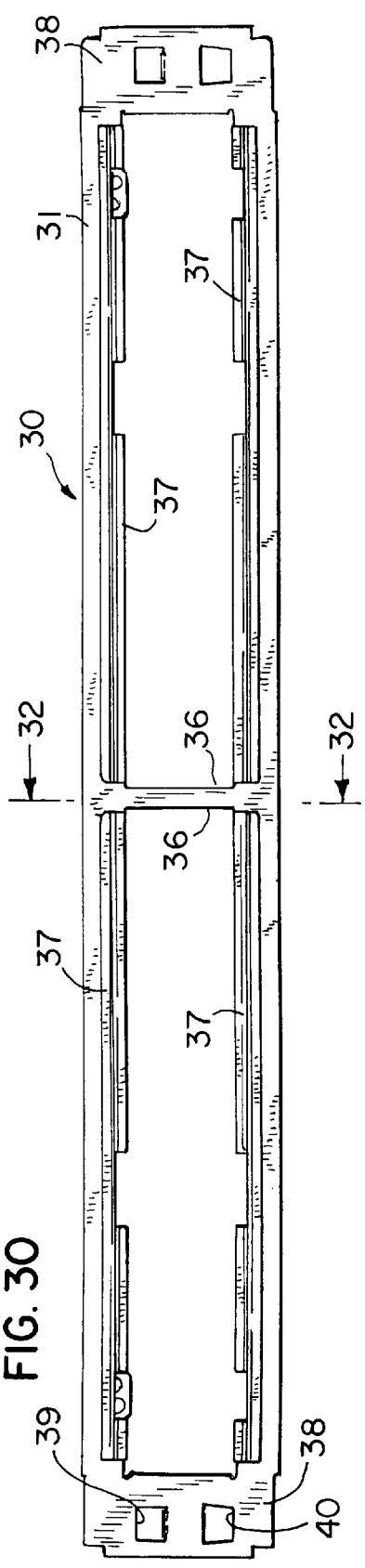
FIG. 30 is a view in elevation of the inner duct member of FIG. 29.
Figure 31:
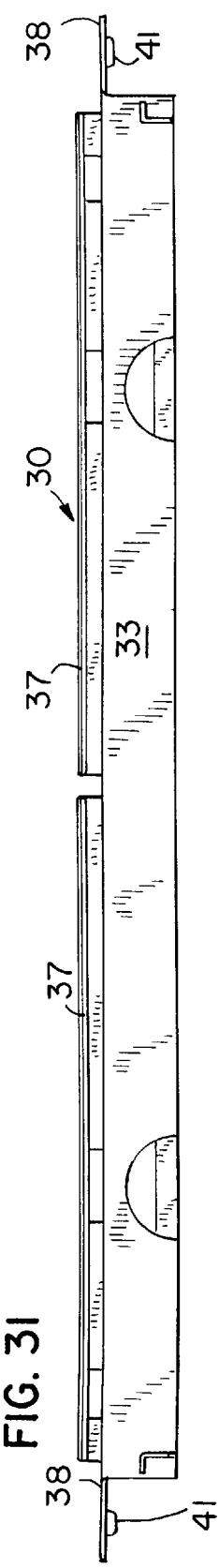
FIG. 31 is a bottom view of the inner duct member of FIGS. 29 and 30.

As shown in FIG. 20, an inner duct member 30 is connected between spaced columns 10 by engaging the tab 41 in a perforation 15 in a column at each end of the inner member 30. The ends 38 are held in place on the columns 10 by resilient retainer clips 42, 42', which are formed in both right and left end versions. As shown in FIG. 27, each retainer clip 42, 42' includes a projecting ledge portion 43 which is adapted to extend through the perforation 40 at an end 38 of the inner member 30 and through an aligned perforation 15 in the column 10. The clip 42, 42' also includes a resilient barb 44 which is adapted to extend through the upper perforation 39 in the end 38 of the inner member 30 and to lock with the aligned perforation 15 in the column 10. The clip 42, 42' is preferably made of a plastic resin material and the inner member 30 is preferably formed from sheet steel.

As shown in FIGS. 21–23 and 28, a typical installation has two inner duct members 30 mounted between a pair of columns 10 and with the ends 38 overlying the front and rear sides of the column. In that position, the upper and lower flanges 34 and 35 of the two inner members 30 will abut. Screws 45 are used to join together the upper flanges 34.

Figure 28:
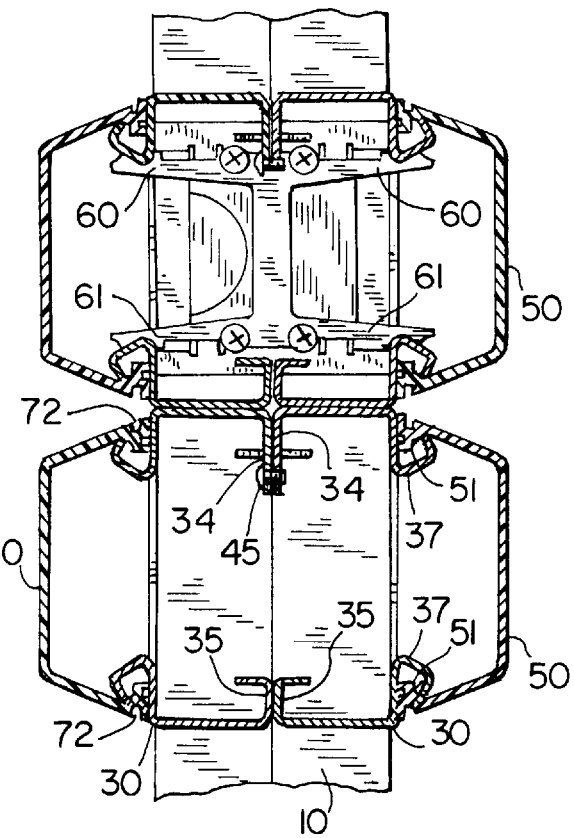
FIG. 28 is a view in vertical section taken in the plane of the line 28—28 of FIG. 24.

A second basic element of the distribution ducts 25 are elongated outer members 50 which extend outwardly from the plane of the face 31 of the inner members 30. As best seen in FIG. 28, the outer members 50 have upper and lower enlarged edges 51 which are snapped in place on the lips 37 of the inner duct member 30. The outer members 50 may be formed of a plastic resin material which has inherent resiliency. As shown in FIG. 28, the inner members 30 and outer members 50 together define a duct space which is both between and in front of (or behind) the columns 10.

Figure 18:
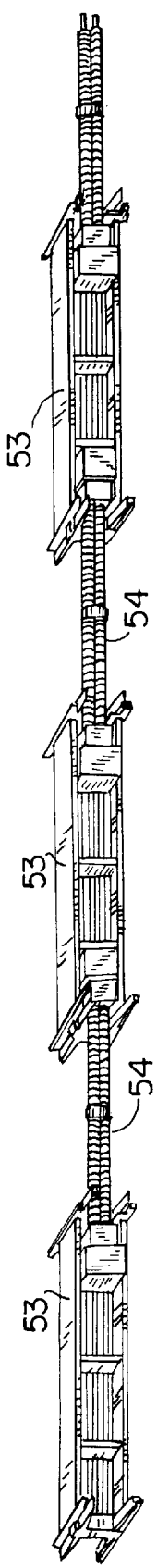
FIG. 18 is a view in perspective of a series of conductor tracks connected in series by connector cables.

The distribution ducts 25 can mount power distribution components of the type shown in U.S. Pat. No. 4,688,869 issued Aug. 25, 1987 to Kelly for "Modular Electrical Wiring Track Arrangement". As shown in FIGS. 16 through 18, such components include tracks 53 which have parallel spaced conductors separated by elongated insulators. Cables of a variety of styles, including a connector cable 54 and a jumper cable 55, attach to the tracks 53. The ends of the cables 54 and 55 mount blocks 56. A series of blades 57 project from the blocks 56 and make contact with the conductors in the track 53. Modules, such as a power outlet module 58, are mounted in the track 53 and have blades on their rear side that engage with conductors in the track 53. As shown in FIG. 18, a series of tracks 53 may be joined together by connector cables 54. The distribution duct 25 of the present invention provides the duct space to accommodate the serial arrangement shown in FIG. 18 with a track 53 disposed within the duct section between each set of adjacent columns and with the connector cables 54 passing over the face of a column. The distribution duct 25 also provides the duct space to accommodate jumper cables 55 in a duct section that does not include a track.

The tracks 53, cables 54, 55, and modules 58 connected thereto are commercially available products and form no part of the present invention. However, the tracks 53 have been modified for attachment to the distribution ducts of the present invention by the addition of resilient upper and lower mounting arms 60 and 61, respectively, at each end of the track 53. As shown in FIG. 28, the arms 60 and 61 engage with the inner edges of the lips 37 of the inner members 30 and are thereby held in place within the duct 25.

Figure 24:
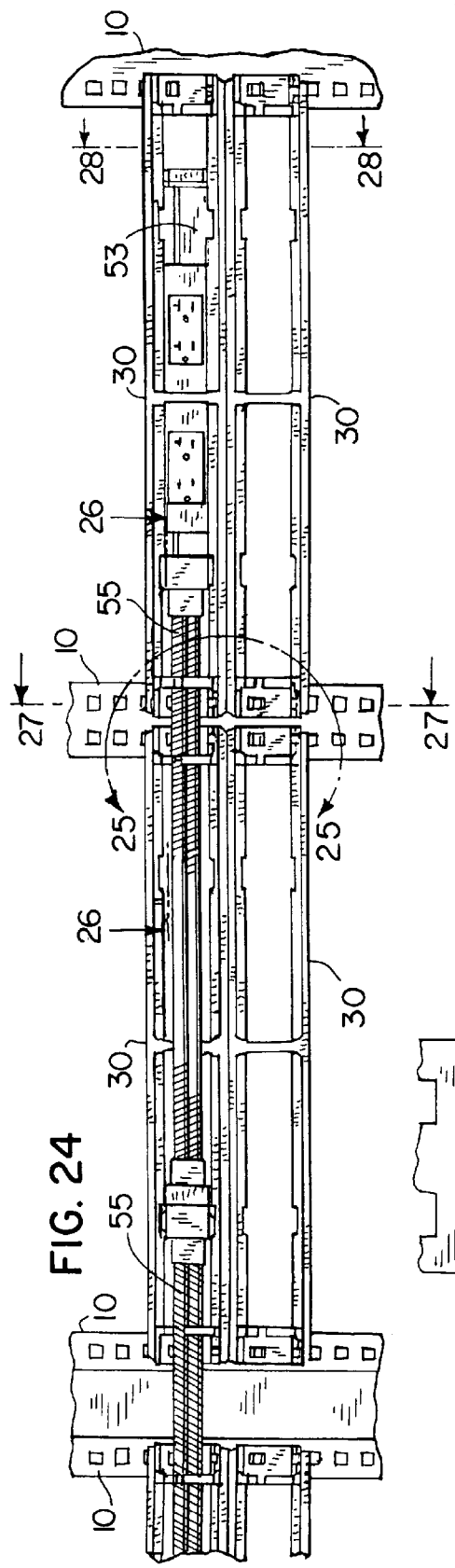
FIG. 24 is a view in elevation of a pair of multiple section distribution ducts that span several columns.
Figure 26:
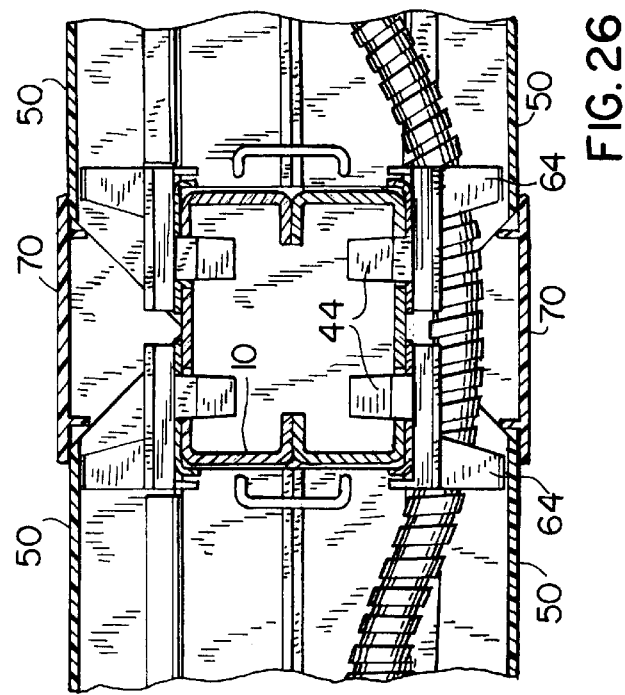
FIG. 26 is an enlarged top view partially in section taken in the plane of the line 26—26 of FIG. 24.
Figure 25:
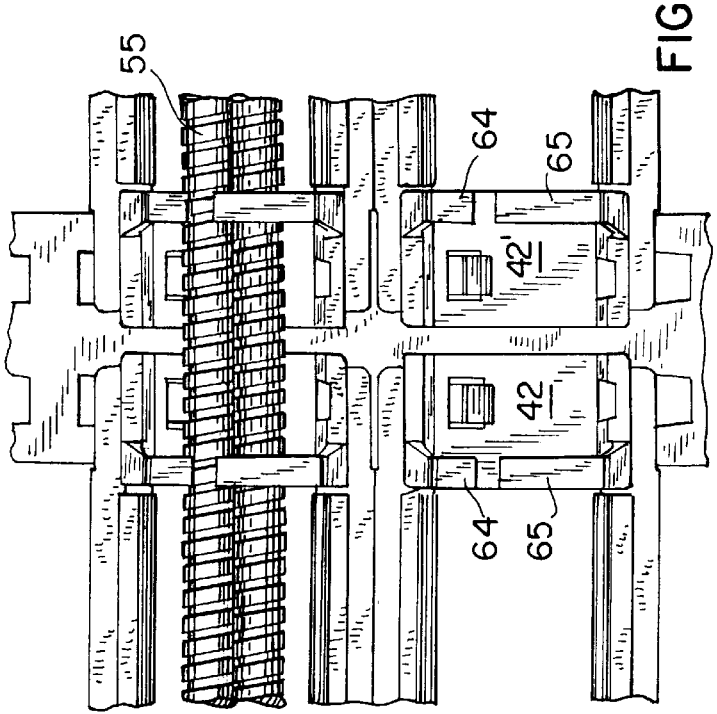
FIG. 25 is an enlarged view of a portion of FIG. 24 in the area of the circle 25—25 of FIG. 24.

As shown in FIGS. 24–26, a cable 54 spanning adjacent duct sections passes over a side of a column 10. The cable 54 is held by flexible fingers 64 and 65 extending from the front of the retainer clips 42, 42'. The outer members 50 are generally coextensive in length with the inner members 30.

Figure 4:
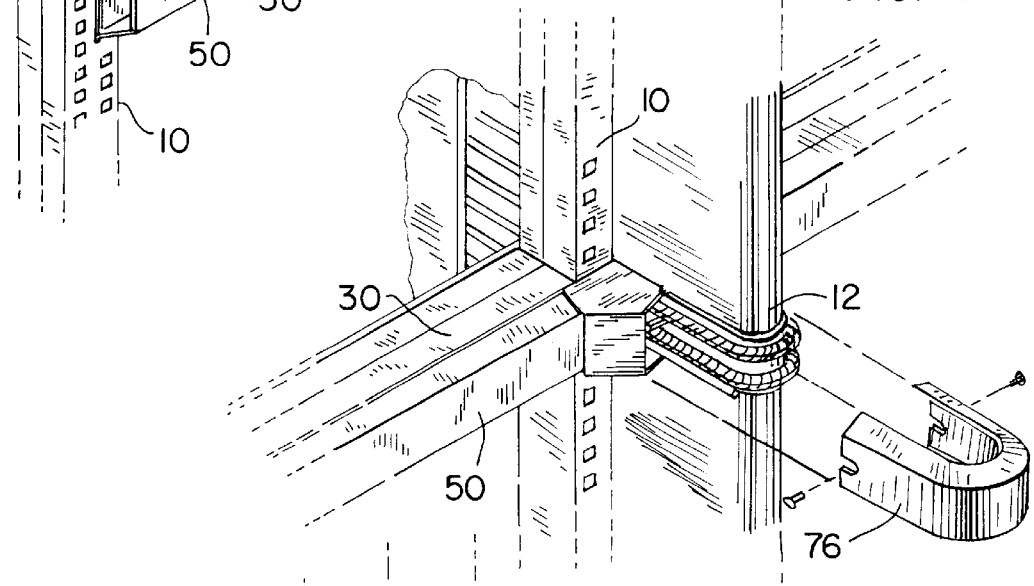
FIG. 4 is a partial exploded view in perspective illustrating the extension of power distribution cords around a projecting face of an upright extending from a column.
Figure 5:
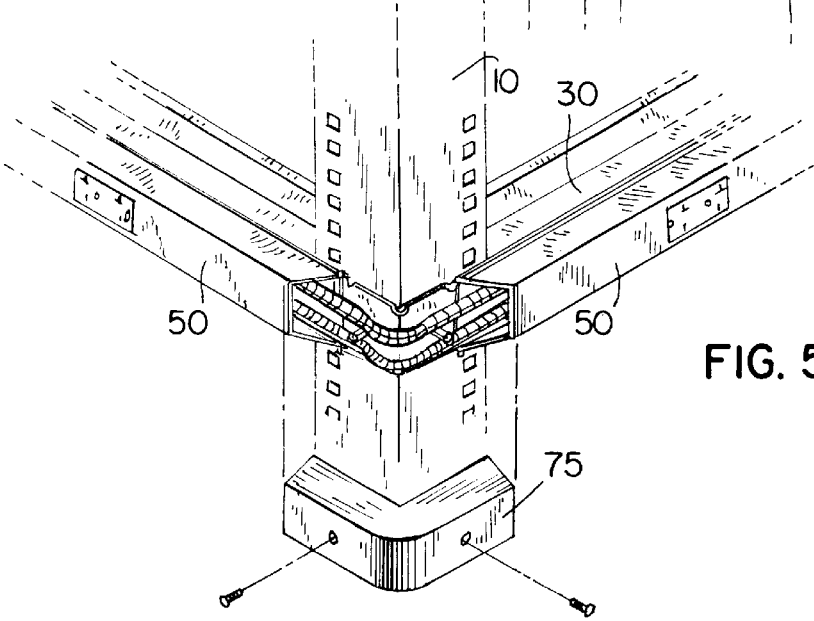
FIG. 5 is a partial exploded view in perspective illustrating the wrapping of power cables around an outside run corner formed by a column.
Figure 6:
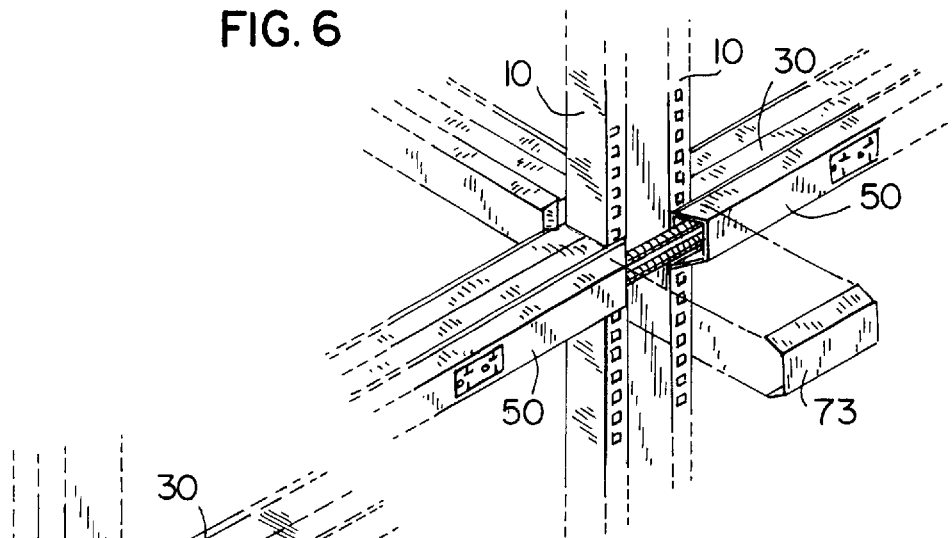
FIG. 6 is a partial exploded view in perspective illustrating power distribution cables extending across one side of spaced columns mounting adjacent distribution ducts.
Figure 7:
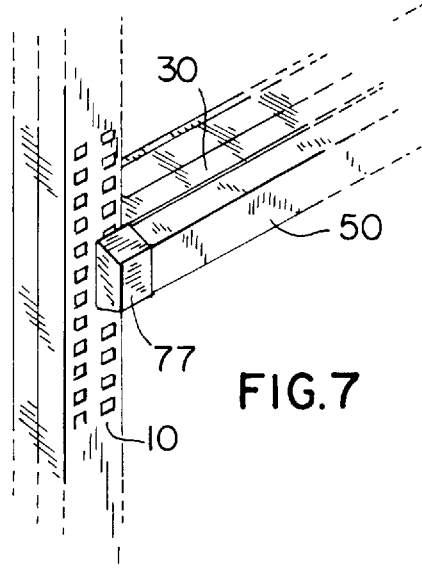
FIG. 7 is a partial view in perspective showing an end cap on the distribution duct.
Figure 8:
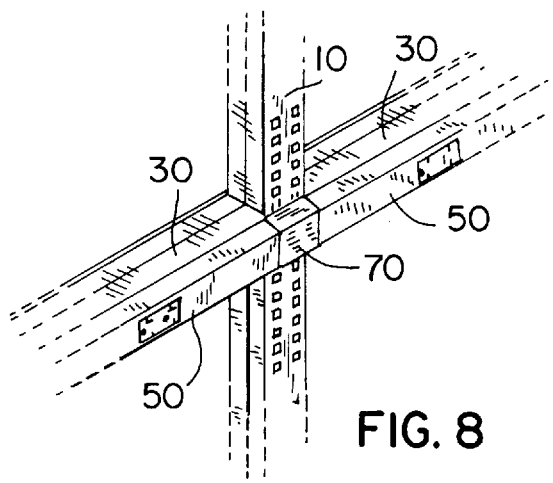
FIG. 8 is a partial view in perspective showing a cover connecting adjacent distribution duct sections that meet at a single column.
Figure 9:
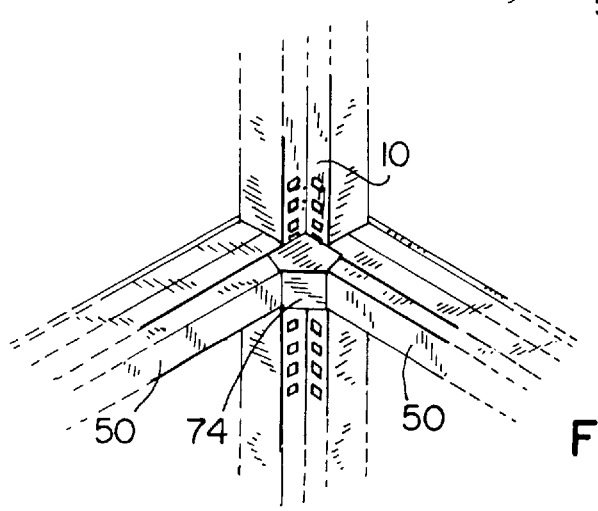
FIG. 9 is a partial view in perspective illustrating a cover for adjacent distribution duct sections that meet at an inside corner.

The result is that there is a gap between adjacent outer members 50 at the face of a column, and the gap is covered by a cover 70. The cover 70 has in-turned fingers 71 at its top and bottom edges. The fingers 71 engage in longitudinally extending grooves 72 in the top and bottom edges 51 of the outer members 50 (see FIG. 27). Similar covers that snap in place to connect the adjacent ends of outer members 50 are provided for a variety of gap formations. For example, a cover 73 is provided to span the face and space between two closely adjacent columns (see FIG. 6), an internal angle cover 74 of similar construction is provided to cover cables that pass over an inside angle at a column (see FIG. 9), and an outside angle cover 75 of similar construction is provided where the cables pass over an outside angle at a column (see FIG. 5). Similarly, when a cable passes over the front of an upright 12, such as shown in FIG. 4, a U-shaped cover 76 is provided. When the duct is to terminate at a column, an end cap 77 is provided, as shown in FIG. 7.

Various approaches can be used to connect the contents of the distribution duct, such as the tracks 53, to the outside environment. When an upright 79 is used, a power line 80 may be connected to the base of the upright 79, extend upwardly to the level of the distribution duct 25, and then pass over the front of the upright 79 and into the open end of the duct 25. Such an arrangement is shown in FIG. 10. Suitable covers may be attached to the outside of the upright 12 to protect the power line 80, as shown in FIG. 13. The cable management elements 14 of an upright may also be used, as shown in FIG. 11, wherein the power line 81 is threaded through the cable management elements 14 and up to the level of the open end of the distribution duct 25. The power line may also extend through conduits up to the face of a distribution duct 25 as shown in FIG. 12. When the power line enters the open end of a distribution duct, a strain relief plate 82 is first inserted onto the end 38 of the inner duct member 30.

Distribution ducts 25 should not carry both power and data communications within the same duct. Therefore, for the typical installation, a separate distribution duct 25 will be formed at one level to carry power while another distribution duct 25 is formed at a second level to carry data communications. This is the arrangement shown in FIGS. 1 and 2 and in FIGS. 24 through 28. For those distribution ducts that carry data communications, the wires can be threaded loosely within the ducts and across the faces of intervening columns as with power cables. A unified connection to the outside may be provided for the separate wiring for power and data communications. This is illustrated in FIGS. 14 and 15. Power cables 90 and 91 are held in cradles 92 formed in a cable carrier 93 attached to an upright 79. A cover 94 is mounted on the carrier 93 and data transmission wires 95 are disposed in the space defined by the cover 94 and carrier 93.

Figure 19:
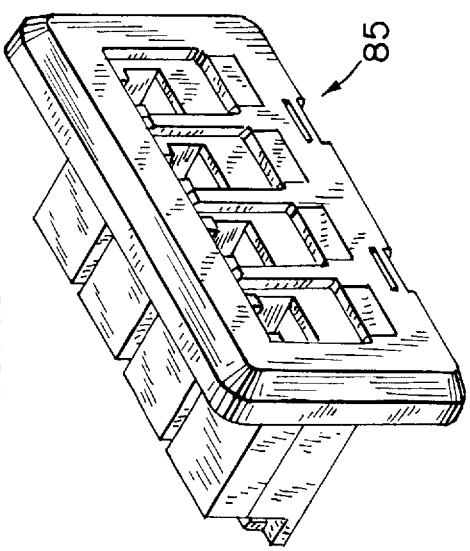
FIG. 19 is a view in perspective of a data wire connector for attachment to data conductors carried in the ducts.
Figure 21:
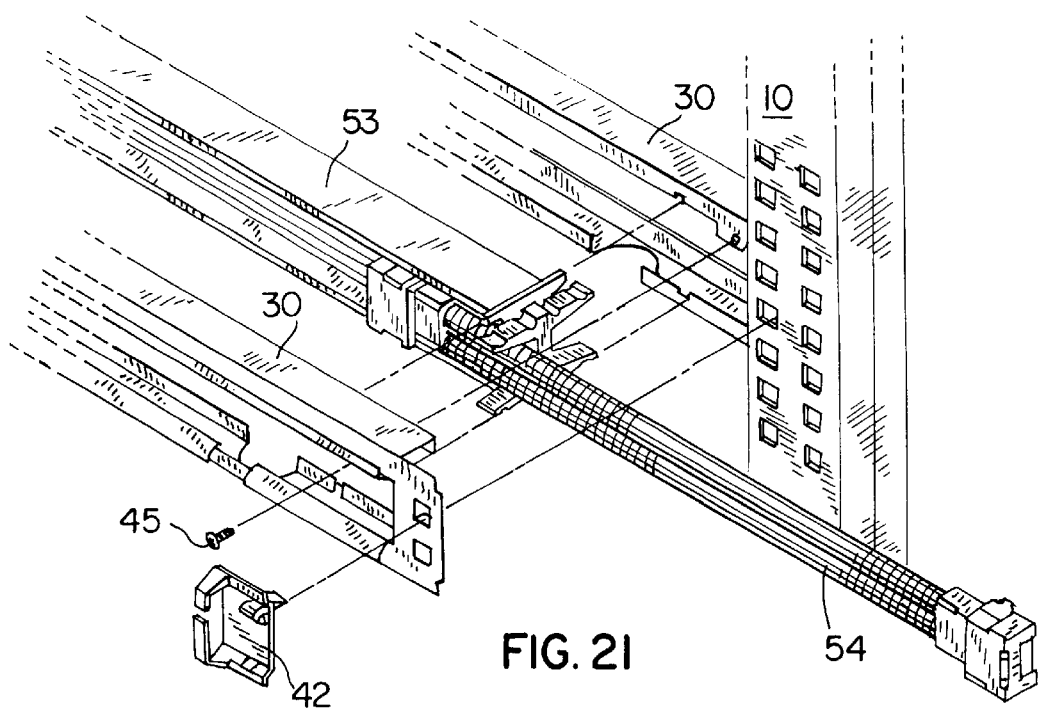
FIG. 21 is a partial exploded view in perspective illustrating the installation of the duct with a conductor track and connector cable.
Figure 22:
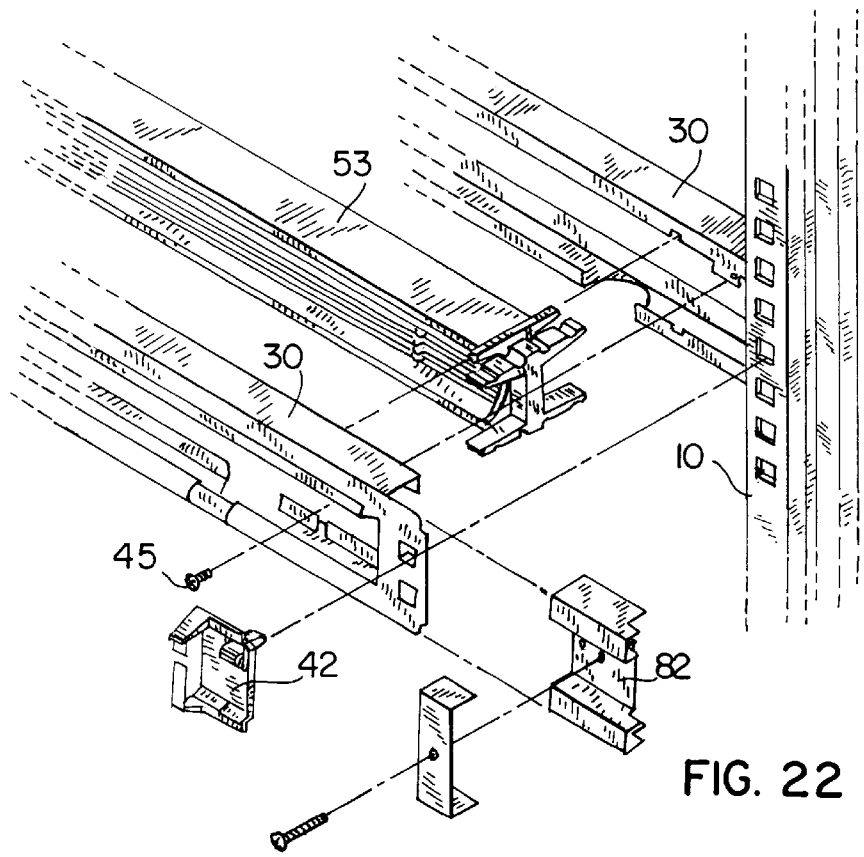
FIG. 22 is a view similar to FIG. 21 but illustrating the installation of a power entry end of the duct to a column.
Figure 23:
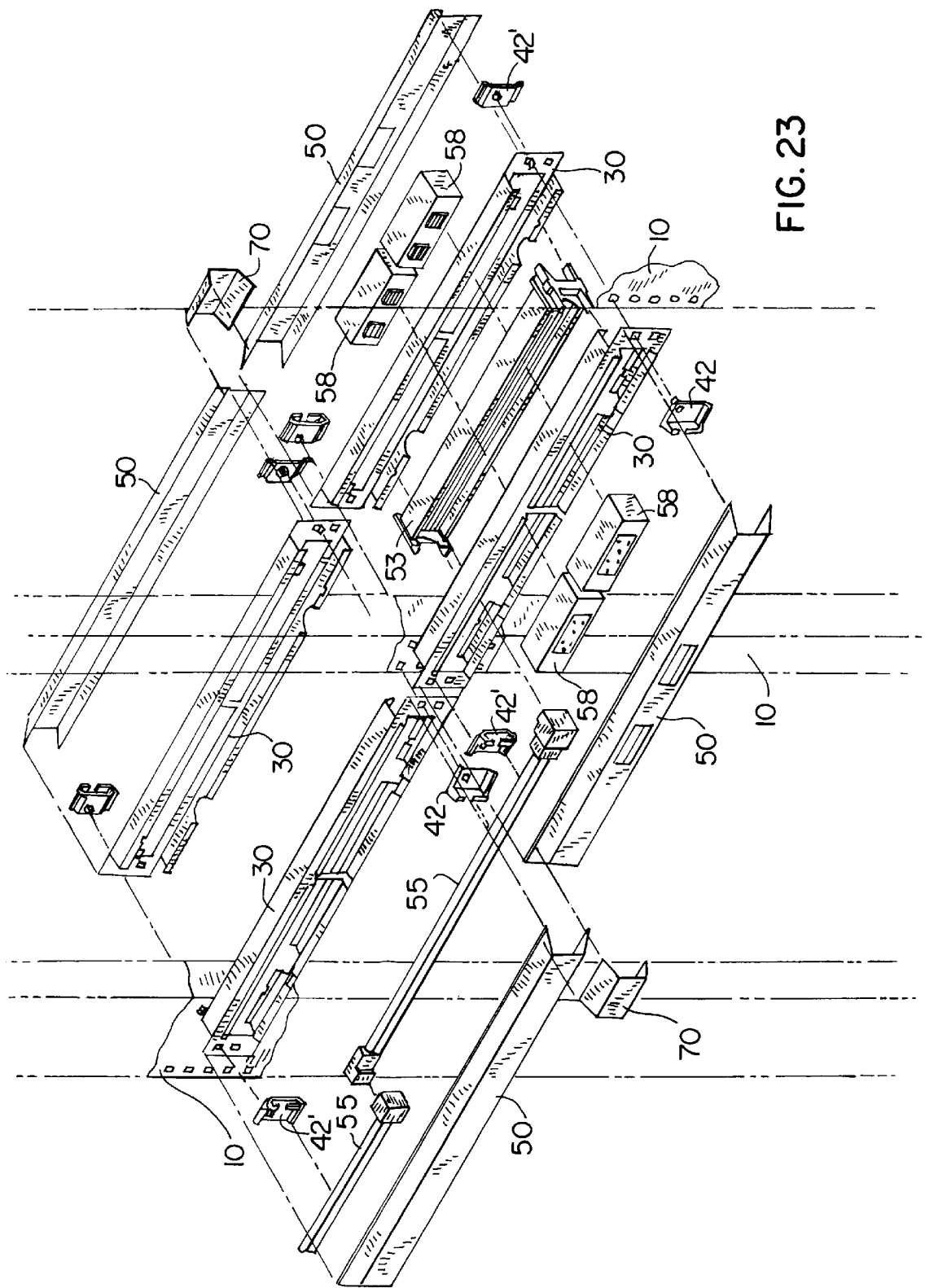
FIG. 23 is an exploded view in perspective showing the components of a completed duct for power distribution that spans several columns.

The outer members 50 are provided with suitable openings at regular intervals to accommodate modules, such as the power outlet module 58, or a data distribution module 85, such as shown in FIG. 19. When an opening is not used, it can be covered by a snap-on cover similar in profile to the covers 70 et seq. that connect adjacent ends of the outer members 50.

We claim:

1. In a work space system of the type having perforated support columns from which elements are supported and having a power distribution duct spanning said columns, said columns having front sides that lie in a plane, said duct containing energy conductors to or from conductor access points spaced along said duct, the improvement wherein said duct comprises:

an elongated inner member that extends transversely between adjacent columns and generally behind the plane of said front sides, said inner member having a first open side; and an elongated outer member covering said first open side and extending outwardly from the front side of said columns.

2. The improvement of claim 1, wherein said energy conductors are included in an electrical conductor track which is contained in the inner member.

3. The improvement of claim 2, wherein an electrical outlet is secured to said track and extends into said outer member.

4. The improvement of claim 1, wherein said columns have rear sides that lie in a plane and said inner member has a second open side opposite from said first open side and an additional elongated outer member covers said second open side and extends outwardly from the rear side of said columns.

5. The improvement of claim 4, wherein conductor access points are provided in both outer members.

6. The improvement of claim 1, wherein said system has at least three adjacent columns including a middle column spaced between two other columns, inner members are positioned in the spaces between said adjacent columns, an elongated outer member covers the first open side of each inner member, and said elongated outer members are connected by a connecting cover which spans the front side of said middle column thereby defining a conduit space between said connecting cover and the front side of said middle column.

7. The improvement of claim 6, wherein electrical conductor tracks are contained in each said duct and a cable which extends through said conduit space connects adjacent tracks.

8. The improvement of claim 1, wherein said duct is removably connected to said columns so as to be adjustable in height on said columns.

9. The improvement of claim 8, wherein the inner member has tabs at its ends that are received in perforations in the columns, fasteners connect the inner member to the columns, and the outer member is attached to the inner member.

10. The improvement of claim 9, wherein the fasteners are retainer clips that include a barb that extends through the inner member and through a column perforation.

11. The improvement of claim 9 wherein the inner member has lips adjacent its top and bottom and the outer member is resiliently mounted on the lips.

12. A distribution duct for a work station system that includes spaced perforated columns from which elements are supported, the columns having front sides that lie in a plane, the duct comprising:

an elongated inner member for extending transversely between adjacent columns and generally behind said plane, said inner member including ends that are adapted to engage with the perforations in the front side of the adjacent columns, said inner member having an open face; and an elongated outer member coextensive with the inner member and covering the open face and for extending outwardly from said plane, the inner and outer members adapted to define an elongated space between and to said front side of the columns.

13. A duct in accordance with claim 12 together with a removable fastener for securing an end of the inner member to a column.

14. A duct in accordance with claim 12 wherein inner members are adapted to extend between adjacent pairs of a plurality of columns, an outer member is disposed on each inner member, and covers connect adjacent outer members.

15. A duct in accordance with claim 12 together with a second elongated inner member for extending transversely between the adjacent columns and including ends that are adapted to engage with the perforations in a rear side of the adjacent columns, the second inner member having an open face, the second inner member being joined back-to-back to the first inner member, and a second elongated outer member coextensive with the second inner member and covering the open face of the second inner member.

16. A duct in accordance with the claim 15 wherein the first and second inner members are identical.

17. A duct in accordance with claim 13 wherein the ends of the inner member are adapted to overlie the front side of the columns and contain perforations that match the perforations in the column, and each end has a tab for engaging a perforation in a column.

18. A duct in accordance with claim 17 wherein the fastener is a removable clip that has a ledge that is adapted to extend through one set of aligned perforations in the end of the inner member and a column, and a resilient barb that is adapted to extend through a second set of aligned perforations.

19. A duct in accordance with claim 14 wherein the outer members snap in place onto the inner members and the covers snap in place on the outer members.

20. A duct in accordance with claim 12 wherein the inner member has upper and lower longitudinal lips at the top and bottom of the open face, and the outer member includes upper and lower edges that are received in the lips to mount the outer member to the inner member.

21. A duct in accordance with claim 20 wherein the upper and lower edges of the outer member include longitudinal grooves, together with a cover having a cross-section profile like that of the outer member and having upper and lower fingers that are received in the grooves.

22. A kit of parts for a distribution duct to be attached to spaced perforated columns having front sides that lie in a plane, comprising:

identical elongated inner members adapted to extend between adjacent columns behind said plane and to attach to the perforations on the front side of the columns, the inner members having an open front face;

identical elongated outer members coextensive in length to the inner members and adapted to attach to a respective inner member to cover the open face thereof, the outer members extending outwardly from the open face; and at least one cover for connecting the ends of adjacent outer members at a column.

23. A kit in accordance with claim 22 together with resilient fasteners for joining the ends of the inner members to the perforations in the columns.

24. A kit in accordance with claim 22 wherein the inner members have rear flanges that are adapted to abut with the rear flanges of another inner member, together with fasteners for joining together the abutting rear flanges.

25. A kit in accordance with claim 24 wherein the inner members are open to the rear, together with an electrical conductor track adapted to be received in a space defined by two inner members arranged back to back.

26. A kit in accordance with claim 25 wherein the ends of the track mount resilient arms that engage the top and bottom of the open front faces of the two inner members.

\* \* \* \* \*